(12) United States Patent
Nakano et al.

(10) Patent No.: US 7,102,497 B2
(45) Date of Patent: Sep. 5, 2006

(54) IN-CAR DEVICE AND PROCESSING METHOD FOR USE WITH THE IN-CAR DEVICE

(75) Inventors: Nobuyuki Nakano, Toyonaka (JP); Ryotaro Iwami, Kobe (JP); Tomohiro Terada, Neyagawa (JP); Susumu Ibaraki, Yokohama (JP); Takashi Kuwabara, Yokohama (JP); Toshihiko Kurosaki, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 232 days.

(21) Appl. No.: 10/866,711

(22) Filed: Jun. 15, 2004

(65) Prior Publication Data

US 2004/0258413 A1 Dec. 23, 2004

(30) Foreign Application Priority Data

Jun. 16, 2003 (JP) ............................. 2003-171142

(51) Int. Cl.
*B60Q 1/00* (2006.01)
(52) U.S. Cl. ............ 340/438; 340/426.13; 340/426.16; 340/426.17
(58) Field of Classification Search ............... None
See application file for complete search history.

(56) References Cited

U.S. PATENT DOCUMENTS 6,243,645 B1* 6/2001 Moteki et al. ............... 701/211
2001/0003439 A1* 6/2001 DeLine et al. ............ 340/815.4

FOREIGN PATENT DOCUMENTS

| EP | 1020329 A1 | 7/2000 |
| JP | 6-103499 | 4/1994 |
| JP | 10-275070 | 10/1998 |
| JP | 2001-502437 | 2/2001 |

OTHER PUBLICATIONS

Patent Abstracts of Japan, vol. 2002, No. 12, Dec. 12, 2002 & JP 2002 243483 A (Mazda Motor Corp), Aug. 28, 2002.
Patent Abstracts of Japan, vol. 2003, No. 12, Dec. 5, 2003 & JP 2003 231427 A (HCX:KK), Aug. 19, 2003.

* cited by examiner

*Primary Examiner*—Julie Bichngoc Lieu
(74) *Attorney, Agent, or Firm*—Wenderoth, Lind & Ponack, L.L.P.

(57) ABSTRACT

First through third light reception elements 111–113 receive infrared data D from an operation input transmission section 2, and output the received data to an operation input permission determination section 12a. The operation input permission determination section 12a distinguishes among the first through third infrared light reception elements 111–113, thereby determining in which space an operation input has been performed, and analyzes the description of the operation input, thereby determining whether to accept the operation input. A calculation processing section 13a performs various processes based on the description of the operation input from the operation input permission determination section 12a, a processing result of a position detection section 17, and map data stored in a map data storage section 16. A drawing processing section 14a performs a process of outputting a processing result of the calculation processing section 13a to first and second displays 3 and 4.

24 Claims, 14 Drawing Sheets

1b: in-car terminal
2: operation input transmission section
5: third display
51: display turn section 1a: in-car terminal
2: operation input transmission section
3: first display
4: second display
11: operation input reception section 11: operation input reception section
111: first infrared light reception element
112: second infrared light reception element
113: third infrared light reception element
114: filter 1a: in-car terminal
11: operation input reception section

FIG. 7

| OPERATING FUNCTION | bit0 | bit1 | bit2 |
|---|---|---|---|
| MAP SCROLL | 0 | 0 | 0 |
| MAP SCALE CHANGE | 1 | 0 | 0 |
| CURRENT POSITION CALL | 0 | 1 | 0 |
| DESTINATION SETTING | 1 | 1 | 0 |
| INFORMATION SEARCH | 0 | 0 | 1 |
| ⋮ | ⋮ | ⋮ | ⋮ |

F I G. 8

| OPERATION POSITION | TRAVELING STATE | MAP SCROLL | MAP SCALE CHANGE | CURRENT POSITION CALL | DESTINATION SETTING | INFORMATION SEARCH | ... |
|---|---|---|---|---|---|---|---|
| DRIVER'S SEAT | HALT | ○ | ○ | ○ | ○ | ○ | ... |
|  | TRAVEL | ○ | ○ | ○ | × | × | ... |
| FRONT PASSENGER SEAT | HALT | ○ | ○ | ○ | ○ | ○ | ... |
|  | TRAVEL | ○ | ○ | ○ | ○ | ○ | ... |
| REAR PASSENGER SEAT | HALT | × | × | ○ | × | × | ... |
|  | TRAVEL | × | × | ○ | × | × | ... |

1b: in-car terminal
2: operation input transmission section
5: third display
11: operation input reception section
51: display turn section 1b: in-car terminal
11: operation input reception section
51: display turn section 1b: in-car terminal
2: operation input transmission section
5: third display
51: display turn section F I G. 1 4
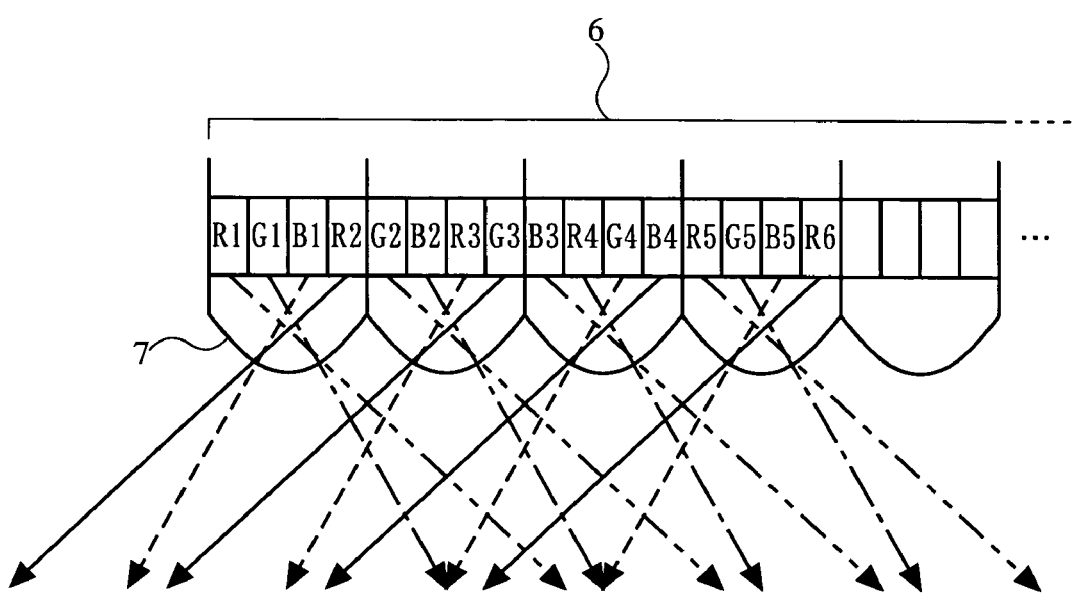

IN-CAR DEVICE AND PROCESSING METHOD FOR USE WITH THE IN-CAR DEVICE

BACKGROUND OF THE INVENTION

1. Field of the Invention

The present invention relates to an in-car device provided so as to be operated by a plurality of occupants in a car, and also relates to a processing method for use with the in-car device. More particularly, the present invention relates to an in-car device which is operated by a plurality of occupants in a car so as to display a result of, for example, navigation processing, and also relates to a processing method for use with the in-car device.

2. Description of the Background Art

In a conventional car navigation device, map data stored in a storage medium, such as a DVD-ROM or a hard disc, is read as necessary to display a map of an area around the current position on an in-car display or to provide audio and visual guidance along a route to a preset destination. Recent years have seen an increase in the number of car navigation devices with a function of reproducing video information, e.g., DVD video information.

In general, a conventional car navigation device as described above includes one display which is shared among the driver and passengers. An infrared remote control is often used as an operation input means of the car navigation device. The driver and the passengers use the infrared remote control to perform prescribed operation inputs. The conventional car navigation device is designed on the premise that the device is mainly operated by the driver, and does not accept any complex operation input while the car is traveling in order to ensure safety during driving. For example, Japanese Patent Laid-Open Publication No. 6-103499 discloses an in-car device including a main operation unit for a driver and a sub operation unit for other occupants, and controls operation inputs from the main operation unit, such that only predetermined inputs are allowed during traveling, thereby ensuring safety during driving (hereinafter, this disclosure is referred to as a "first conventional technique").

Further, Japanese National Phase PCT Laid-Open Publication No. 2001-502437 discloses an in-car device including two sets of displays and operation input means for the driver and passengers (hereinafter, this disclosure is referred to as a "second conventional technique"). On one display, an image is displayed for the driver, while on the other display, an image is display for the passengers. A control switch is fixed in the vicinity of each of the displays.

In a conventional car navigation device, however, functions which can be operated during traveling are generally limited in order to ensure safety, resulting in considerable inconvenience. Particularly, in a conventional car navigation device including only one operation input means per display, it is not possible to detect whether the user having performed an operation input is the driver or a passenger. Accordingly, even the passenger, who can operate the operation input means during traveling without any trouble, is not allowed to perform a complex operation of setting a destination, for example, impairing the usability of the conventional car navigation device.

Therefore, in the first conventional technique, the main operation unit for the driver and the sub operation unit for the passengers are provided for controlling operation inputs from the main operation unit, such that only predetermined inputs are allowed during traveling, thereby ensuring safety and convenience during traveling. However, in the first conventional technique, it is necessary to provide a plurality of operation units, resulting in a complicated device structure. Further, Japanese Patent Laid-Open Publication No. 6-103499 does not disclose any specific method for achieving an effect similar to that as described above by using only one infrared remote control which is highly convenient for use in the car. In the second conventional technique, since the in-car device includes a plurality of displays, operation inputs are frequently operated by occupants other than the driver. Accordingly, if functions which can be operated during traveling are limited, the user frequently suffers from inconvenience.

In the second conventional technique, the in-car device has a control switch fixed for operating the in-car device, and therefore a passenger in a seat, such as a rear passenger seat, which is located afar from the in-car device, has a difficulty in operating the in-car device. If a plurality of control switches are individually provided for all seat positions, a cost increase is caused by increasing the number of control switches. If the control switches are wired, wiring to the in-car device becomes complicated.

Further, in the case where one display is shared between a plurality of occupants, if the display is directed to one direction, visibility and usability may be impaired. For example, if a passenger in a front passenger seat wishes to perform a destination setting, the display is turned toward the front passenger seat in order to facilitate easy viewing of the display. However, if route guidance is started after a destination setting and a route search are completed, it is necessary to turn the display to a direction such that the driver can easily view the display.

SUMMARY OF THE INVENTION

Therefore, an object of the present invention is to provide an in-car device having an operation input unit, which causes safety during driving to be compatible with convenience of the device, as well as a processing method for use with the same in-car device. Another object of the present invention is to provide an in-car device, which enhances visibility of the user and usability of the device, as well as a processing method for use with the same in-car device.

The present invention has the following features to attain the object mentioned above. Note that reference numerals and the like in parentheses are provided below to show correspondence with embodiments, which will be described later, in order to aid in the understanding of the present invention, and are not intended to limit the scope of the present invention.

A first aspect of the present invention is directed to an in-car device for implementing processing in accordance with an operation instruction from an occupant (90, 91, 92, or 93) of a car. The device includes: an operation input transmission section (2) for emitting a beam in accordance with the occupant's operation, the beam carrying data (infrared data D) which indicates an operation instruction given by the occupant's operation; an operation input reception section (11) for receiving the data emitted from the operation input transmission section (2) located in one of a plurality of spatial segments (light receivable spaces A through C) defined in the car (a car interior space R); and a processing section (13) for implementing a process, which corresponds to the operation instruction (an operating function indicated by a data field Bd) indicated by the data received by the operation input reception section (11), in accordance with the operation instruction indicated by the data received by the operation input reception section (11) and a spatial segment in which the data has been emitted.

In the first aspect, it is possible to identify a spatial segment, in which an operation input has been performed using one operation input transmission section, from among the plurality of spatial segments defined in the car, and to implement a process corresponding to the operation input. For example, it is possible to selectively set whether to permit the process instructed by the operation input in accordance with a characteristic of an occupant who is highly likely to be seated in the spatial segment.

The operation input reception section may include a plurality of light reception elements (first through third infrared light reception elements 111–113) each receiving the data (data D1, D2, or D3) emitted from the operation input transmission section located in a corresponding one of the plurality of spatial segments, and outputting the received data so as to be identified as having been emitted from the spatial segment. Since the plurality of light reception elements are provided so as to receive their corresponding data outputted from the plurality of spatial segments, it is possible to identify the spatial segment from which data received by each spatial segment has been outputted, thereby facilitating easy handling of the data. Moreover, the operation input reception section may further include a filter (114) provided on a side of the plurality of the spatial segments so as to form a gap having a predetermined size with a light reception portion of each of the plurality of light reception elements, the filter having a transmission region (an infrared transmission region S) through which the beam emitted from the operation input transmission section is transmitted. In this case, the plurality of light reception elements each receive, through the transmission region of the filter, the data emitted from the operation input transmission section located in the corresponding one of the plurality of spatial segments. Therefore, by merely forming a single light receivable region outside the in-car device, it is possible to distinguish among data received from the plurality of spatial segments, and simplify the structure of the operation input reception section. Moreover, an occupant of the car having the in-car device installed therein can operate the operation input transmission section so as to be directed to the same light receivable region regardless of where in the spatial segment the operation input transmission section is operated. Furthermore, the plurality of light reception elements may be provided at predetermined intervals in a horizontal direction. Thus, a light unreceivable space is formed between light receivable regions such that all of the plurality of light reception elements cannot receive light outputted therefrom. Therefore, it is possible to prevent the plurality of light reception elements from receiving data outputted from a spatial segment corresponding to one light reception element.

Specifically, the plurality of spatial segments are defined in accordance with positions of seats (80 through 82) provided in the car. Thus, it is possible to implement processes in accordance with the positions of the seats provided in the car. For example, it is possible to identify a position from which data has been outputted from among the driver's seat, a front passenger seat, and a rear passenger seat. Accordingly, it is possible to restrict the driver in the driver's seat and a passenger in the rear passenger seat located afar from the in-car device to their respectively defined input operations. Moreover, it is possible to set input operations of a passenger in the front passenger seat so as not to be restricted.

Specifically, the operation input transmission section emits the data by infrared radiation. Since a beam with high directivity is used for emitting the data by infrared radiation, it is possible to provide a highly cost-effective operation input transmission section, while maintaining the accuracy of data to be outputted.

The in-car device may further include an operation input permission determination section (12) for permitting the process, which corresponds to the operation instruction indicated by the data received by the operation input reception section, in accordance with the operation instruction indicated by the data received by the operation input reception section and the spatial segment in which the data has been emitted. In this case, the processing section implements the process permitted by the operation input permission determination section. Accordingly, it is possible to identify a spatial segment from which the data has been outputted, and to determine whether to implement a process corresponding to an operation instruction represented by the data. Moreover, the in-car device may further include a table storage section (15) having stored therein an operation input permission table describing which process is permitted for combinations of operation instructions and the plurality of spatial segments. In this case, the operation input permission determination section refers to the operation input permission table for a combination of the operation instruction indicated by the data received by the operation input reception section and the spatial segment in which the data has been emitted, thereby determining whether to permit the process, which corresponds to the operation instruction indicated by the data received by the operation input reception section. Accordingly, it is possible to determine whether to permit a process in accordance with the combination of the operation instruction indicated by the data received by the operation input reception section and the spatial segment in which the data has been emitted. For example, in order to prevent an operation instruction, which requires a complex input operation, from being erroneously outputted from a spatial segment located afar from the in-car device, it is possible to determine the settings so as not to permit any process instructed by an operation input outputted from the spatial segment located afar from the in-car device. Further, by permitting any process instructed by an operation input outputted from a spatial segment including the front passenger seat located near the in-car device, it is made possible to achieve convenient use of the in-car device. The in-car device may further include a travel state detection section for detecting a current travel state of the car. In this case, the operation input permission table describes which process is permitted for combinations of the operation instructions, the plurality of spatial segments, and travel states of the car, and the operation input permission determination section refers to the operation input permission table for a combination of the operation instruction indicated by the data received by the operation input reception section, the spatial segment in which the data has been emitted, and the current travel state detected by the travel state detection section, thereby determining whether to permit the process, which corresponds to the operation instruction indicated by the data received by the operation input reception section. Accordingly, it is possible to determine whether to permit a process in accordance with a combination of a spatial segment in which data has been emitted, and a travel state of the car. Specifically, it is possible to prohibit any process instructed by an operation input performed while the car is traveling, and it is also possible to allow any process instructed by an operation input performed while the car is in a halt state.

Therefore, it is possible to ensure the safety of a traveling car. Specifically, the operation input permission table describes which process is permitted for combinations of a spatial segment (a light receivable space B) including the driver's seat (80), and travel states indicating that the car is currently traveling. This allows the in-car device to avoid any risk which can be caused by the driver performing an operation while driving the car.

The in-car device may further include: a plurality of displays (first and second displays 3 and 4) for displaying video information on their respective display planes each being directed to a corresponding occupant's seat; and a drawing processing section (14*a*) for outputting the video information obtained from the process implemented by the processing section to each of the plurality of displays. Since the plurality of displays are provided so as to be directed to their corresponding occupants' seats, each occupant can more frequently perform an operation input, resulting in an increase in the number of operation inputs. Even if the operation inputs are performed more frequently, it is possible to identify a spatial segment, in which an operation input has been performed using one operation input transmission section, from among the plurality of spatial segments defined in the car, and to implement a process corresponding to the operation input. For example, it is possible to selectively set whether to permit a process instructed by an operation input in accordance with a characteristic of an occupant who is highly likely to be seated in the spatial segment, thereby preventing any inconvenience from being frequently caused because operable functions are equally restricted in the plurality of spatial segments.

The in-car device may further include: a display (a third display 5) having a display plane on which video information is displayed; a display turn section (51) for turning the display to change a direction to which the display plane is directed; and a drawing processing section (14*b*) for outputting the video information obtained from the process implemented by the processing section to the display. In this case, the processing section includes a direction instruction section (a stepping motor control IC) for outputting an instruction to the display turn section so as to turn the display plane of the display to a direction of the spatial segment in which the data received by the operation input reception section has been emitted. This allows the display to turn so as to have its display plane directed to the user, and therefore even if there is only one display, it is possible to achieve an effect of facilitating easy viewing of the display from each occupant of the car as well as easy operation of the in-car device.

The in-car device may further include: a map data storage section (16) having predetermined map data stored therein; and a position detection section (17) for detecting a current position of the car. In this case, the processing section implements the process, which corresponds to the operation instruction indicated by the data received by the operation input reception section, based on the map data stored in the map data storage section and the current position detected by the position detection section, and the drawing process section outputs to the display the video information obtained from the process implemented by the processing section based on the map data and the current position. This allows an in-car device, which performs a navigation process based on the map data and a current position, to achieve an effect similar to that achieved by the above described in-car device of the first aspect.

A second aspect of the present invention is directed to a processing method for implementing processing in accordance with an operation instruction from an occupant of a car. The method includes the steps of: emitting a beam in accordance with the occupant's operation, the beam carrying data which indicates an operation instruction given by the occupant's operation; receiving the emitted data from a direction of one of a plurality of spatial segments defined in the car; and implementing a process, which corresponds to the operation instruction indicated by the received data, in accordance with the operation instruction indicated by the received data and a spatial segment in which the data has been emitted.

In the second aspect, it is possible to identify a spatial segment, in which an operation input has been performed by an occupant of the car, from among the plurality of spatial segments defined in the car, and to implement a process corresponding to the operation input. For example, it is possible to selectively set whether to permit the process instructed by the operation input in accordance with a characteristic of an occupant who is highly likely to be seated in the spatial segment.

Further, the emitted data may be received from the direction of one of the plurality of spatial segments, and the received data may be identified as having been emitted from the spatial segment.

Specifically, the spatial segments are defined in accordance with positions of seats provided in the car.

Specifically, the data is emitted by infrared radiation.

Furthermore, the processing method may further include the steps of: permitting the process, which corresponds to the operation instruction indicated by the received data, in accordance with the operation instruction indicated by the received data and the spatial segment in which the data has been emitted; and implementing the permitted process. Moreover, the processing method may further include the step of referring to an operation input permission table for a combination of the operation instruction indicated by the received data and the spatial segment in which the data has been emitted, thereby determining whether to permit the process, which corresponds to the operation instruction indicated by the received data. Specifically, the operation input permission table describes which process is permitted for combinations of operation instructions and the plurality of spatial segments. Moreover, the processing method further includes the steps of: detecting a current travel state of the car; and referring to the operation input permission table for a combination of the operation instruction indicated by the received data, the spatial segment in which the data has been emitted, and the detected current travel state, thereby determining whether to permit the process, which corresponds to the operation instruction indicated by the received data. Moreover, the operation input permission table may describe which process is permitted for combinations of the plurality of spatial segments, which include a driver's seat, and the travel states, which include a travel state indicating that the car is currently traveling.

Further still, the processing method may further include the steps of: generating video information based on a result of the process implemented in accordance with the operation instruction; and displaying the video information on different display planes corresponding to seats of occupants.

Further still, the processing method further includes the steps of: generating video information based on a result of the process implemented in accordance with the operation instruction; displaying the video information on a display plane; and turning the display plane to be directed to a direction of a spatial segment in which the received data has been emitted Further still, the processing method may further include the steps of: detecting a current position of the car; implementing the process, which corresponds to the operation instruction indicated by the received data, based on predetermined map data and the detected current position; generating video information based on a result of the process, which has been implemented based on predetermined map data and the detected current position; and displaying the generated video information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram used for explaining an exemplary operating function allocation table stored in an operation input table storage section 15 of FIG. 2;

FIG. 8 is a diagram used for explaining an exemplary operation input permission table stored in the operation input table storage section 15 of FIG. 2;

FIG. 14 is a view showing a schematic display structure and used for explaining an applicable variation of the present invention.

DESCRIPTION OF THE PREFERRED EMBODIMENTS (First Embodiment)

Figure 1:
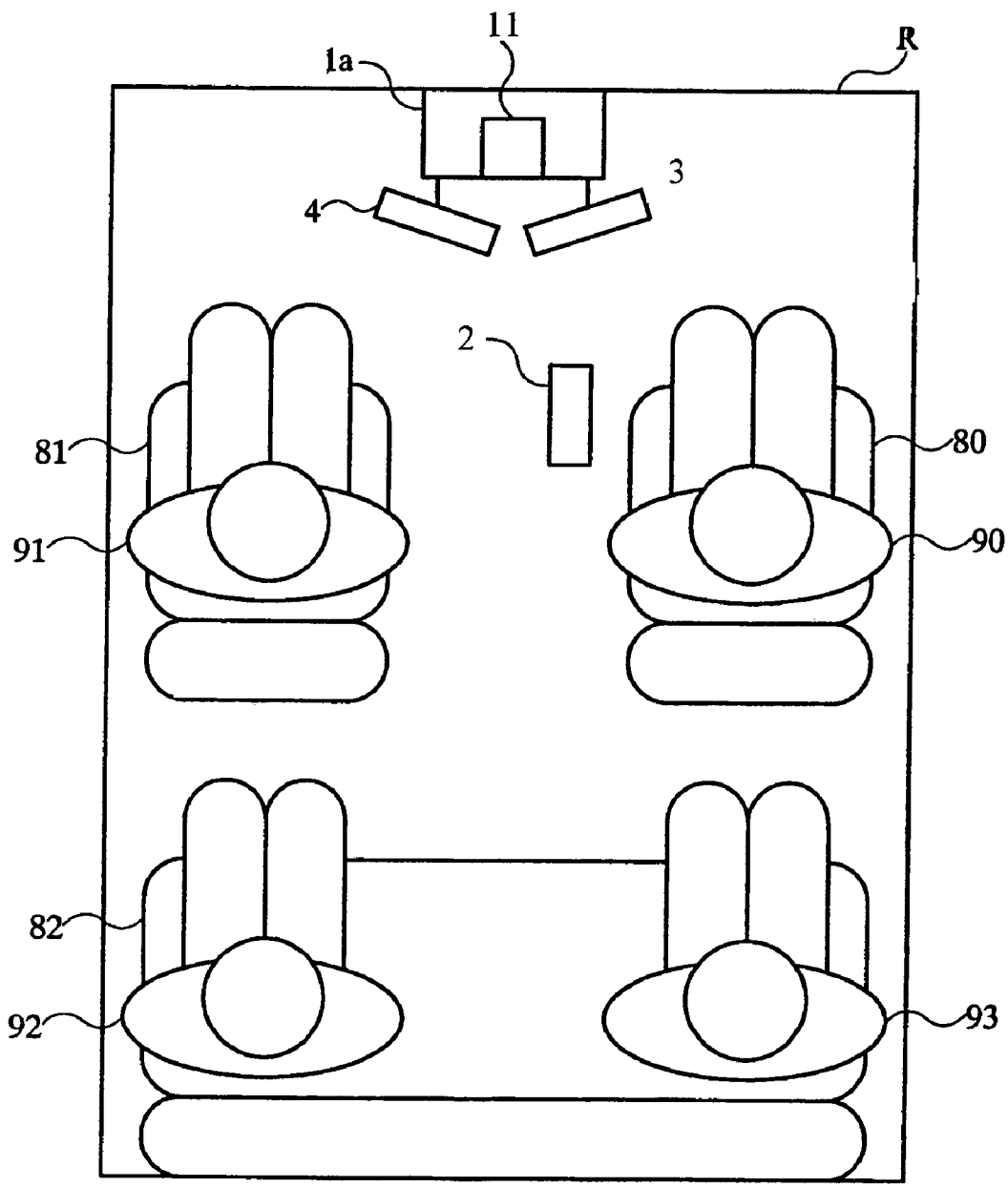
FIG. 1 is a top view schematically showing an exemplary car interior space in which an in-car device according to a first embodiment of the present invention is installed.

An in-car device according to a first embodiment of the present invention is described below with reference to FIG. 1. As described below, the in-car device according to the first embodiment is, for example, a display device including two displays respectively directed toward the driver's seat and a front passenger seat. FIG. 1 is a top view schematically showing an exemplary car interior space in which the in-car device is installed.

In FIG. 1, a car interior space R includes a driver's seat 80, a front passenger seat 81, and a rear passenger seat 82. In the car interior space R shown in FIG. 1, a driver 90 is in the driver's seat 80, a passenger 91 is in the front passenger seat, and passengers 92 and 93 are in the rear passenger seat 82. The in-car device includes an in-car terminal 1a, an operation input transmission section 2, a first display 3, and a second display 4. The operation input transmission section 2 is a wireless remote control which outputs data for operating the in-car terminal 1a. The data outputted from the operation input transmission section 2 is carried by a directional beam. For example, the operation input transmission section 2 is an infrared wireless remote control which outputs infrared data in accordance with an occupant's operation. The operation input transmission section 2 can be moved anywhere in the car interior space R, and has a plurality of operation buttons which are not shown. The in-car terminal 1a is fixed in the car interior space R so as to be located ahead substantially from the middle between the driver's seat 80 and the front passenger seat 81. The in-car terminal 1a includes an operation input reception section 11 for receiving the infrared data outputted from the operation input transmission section 2. The in-car terminal 1a implements processing in accordance with the infrared data outputted from the operation input transmission section 2, and outputs a processing result to the first and second displays 3 and 4. The first display 3 is fixed on the in-car terminal 1a, or on a suitable place in the car interior space R, so as to be directed to the driver's seat 80. Similarly, the second display 4 is fixed on the in-car terminal 1a, or on a suitable place in the car interior space R, so as to be directed to the front passenger seat 81. The first and second displays 3 and 4 each essentially include a crystal liquid device and a drive device thereof. The first and second displays 3 and 4 each may further include a sound output device, e.g., a loudspeaker, such that the first and second displays 3 and 4 can display an image and/or generate sound as a processing result of the in-car terminal 1a. For simplification of description, in the following example, the in-car terminal 1a displays an image as the processing result on the first and second displays 3 and 4.

Figure 2:
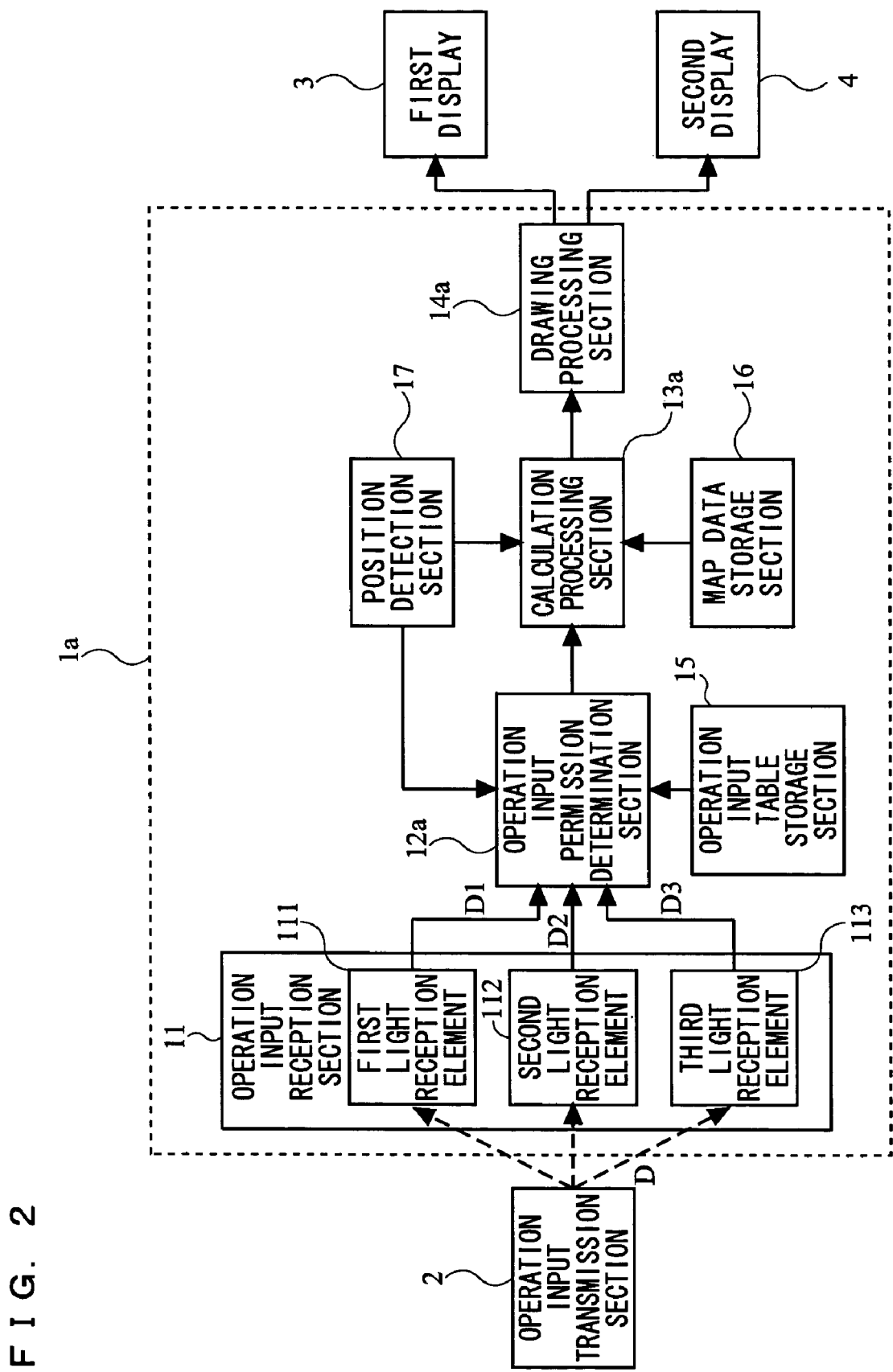
FIG. 2 is a functional block diagram showing a structure of the in-car device shown in FIG. 1.

Next, a structure of the in-car device according to the first embodiment is described with reference to FIG. 2. FIG. 2 is a functional block diagram showing the structure of the in-car device according to the first embodiment.

In FIG. 2, as described above, the in-car device includes the in-car terminal 1a, the operation input transmission section 2, and the first and second displays 3 and 4. The in-car terminal 1a includes the operation input reception section 11, an operation input permission determination section 12a, a calculation processing section 13a, a drawing processing section 14a, an operation input table storage section 15, a map data storage section 16, and a position detection section 17.

The operation input reception section 11 has first through third infrared light reception elements 111 through 113. The first through third infrared light reception elements 111 through 113 receive infrared data D outputted from the operation input transmission section 2, and convert the infrared data D into electrical signal data D1 through D3, respectively. The electrical signal data D1 through D3 are outputted to the operation input permission determination section 12a.

The operation input permission determination section 12a recognizes that the data D1 through D3 received from the operation input reception section 11 are respectively derived from the first through third infrared light reception elements 111 through 113. The operation input permission determination section 12a analyzes descriptions of operation inputs represented by the data D1 through D3, and determines whether to accept the operation inputs from the output sources, i.e., the first through third infrared light reception elements 111 through 113. Specifically, the operation input permission determination section 12a obtains a current travel state of the car from the position detection section 17, and refers to an operating function allocation table and an operation input permission table, which are stored in the operation input table storage section 15 and will be described later, to determine whether combinations of the output sources and the descriptions of the operation inputs are acceptable. If there is an acceptable combination of an output source and a description of an operation input, the operation input permission determination section 12a outputs the description of the operation input to the calculation processing section 13a. On the other hand, if there is no acceptable combination, the operation input permission determination section 12a deletes the data D1 through D3 received from the operation input reception section 11, for example, without outputting the descriptions of the operation inputs to the calculation processing section 13a.

The position detection section 17 includes a speed sensor, a gyro sensor, or an antenna and a receiver of a global positioning system (GPS). Alternatively, the position detection section 17 may include a combination of two or more elements selected from among the speed sensor, the gyro sensor, and the GPS antenna and receiver. In the position detection section 17, the speed sensor detects a travel speed of the car having the in-car device, and a travel distance is calculated based on the detected travel speed. The gyro sensor detects a travel direction of the car. Radio waves are received from a satellite via the GPS antenna and receiver to detect an absolute position of the car. Detection results are outputted to the calculation processing section 13a. It is also conceivable that map data, which is stored in the map data storage section 16 and will be described later, is used based on inputs from the above sensors, to perform a map matching process or the like for correcting the current car position on the map so as to match the current car position on the road.

The map data storage section 16 includes a storage medium, such as a CD-ROM, a DVD-ROM, a hard disk, or the like, and a drive device for use with the storage medium. The map data storage section 16 stores, for example, vector map data for use in a display process, road network data for use in route search and position detection, and search data for use in information search. The above-described data are read based on calculation by the calculation processing section 13a.

The calculation processing section 13a performs various types of data processing based on the description of the operation input received from the operation input permission determination section 12a, a processing result received from the position detection section 17, and the map data stored in the map data storage section 16. Examples of the data processing performed by the calculation processing section 13a include a process of displaying a map of an area around an arbitrary location, a process of searching for a route between arbitrary locations, and a process of providing guidance along an obtained route.

The drawing processing section 14a performs a process of outputting a processing result of the calculation processing section 13a to the first and second displays 3 and 4. Note that the operation input permission determination section 12a, the calculation processing section 13a, the drawing processing section 14a, and the operation input table storage section 15 are realized by a computer system including a central processing unit (CPU), various processors, a memory, a hard disk, etc.

Next, a general operation of the in-car device is described. After an operating system of the in-car device is booted, an occupant of the car sets a destination. In one method of setting a destination, a map of an area around the destination is displayed on the first and second displays 3 and 4, and then the occupant of the car operates the operation input transmission section 2 to put a cursor on the destination and depresses a destination setting button of the operation input transmission section 2. In this case, coordinates of the destination are calculated from the origin which is set at the location of the map where the destination setting button is depressed. In another method of setting a destination, the occupant of the car operates numeric keys of the operation input transmission section 2 to enter a telephone number of an establishment at the destination. In this case, telephone number search data stored in the map data storage section 16 is searched through for establishment data associated with the entered telephone number, and coordinate information assigned to the establishment data is extracted as the coordinates of the destination. Similarly, search data stored in the map data storage section 16 is referenced to search for the destination establishment by name or type.

Upon input of the destination, the calculation processing section 13a reads the map data stored in the map data storage section 16, and obtains an optimal route from the current position detected by the position detection section 17 to the destination set in a manner as described above. The optimal route is obtained using a suitable known technique, e.g., Dijkstra's algorithm.

After the optimal route from the current position to the destination is obtained, the calculation processing section 13a controls the drawing processing section 14a so as to display the optimal route overlaid on the map data on the first and second displays 3 and 4. Moreover, the calculation processing section 13a overlays a current position mark on the displayed map data based on the coordinates of the current position detected by the position detection section 17.

The position detection section 17 sequentially detects the current position as the car travels along the optimal route, and the calculation processing section 13a reads map data of an area around the current position from the map data storage section 16 in accordance with detection by the position detection section 17, and displays the map data on the first and second displays 3 and 4. Moreover, when the car travels and approaches within a predetermined distance of an intersection, the calculation processing section 13a displays an enlarged view of the intersection on the first and second displays 3 and 4. In this case, it is also possible to verbally provide the driver with information required for guidance, such as a direction to take at the intersection, the name of the intersection, etc. The in-car device repeatedly performs processing as described above from a start point to the destination.

Figure 3:
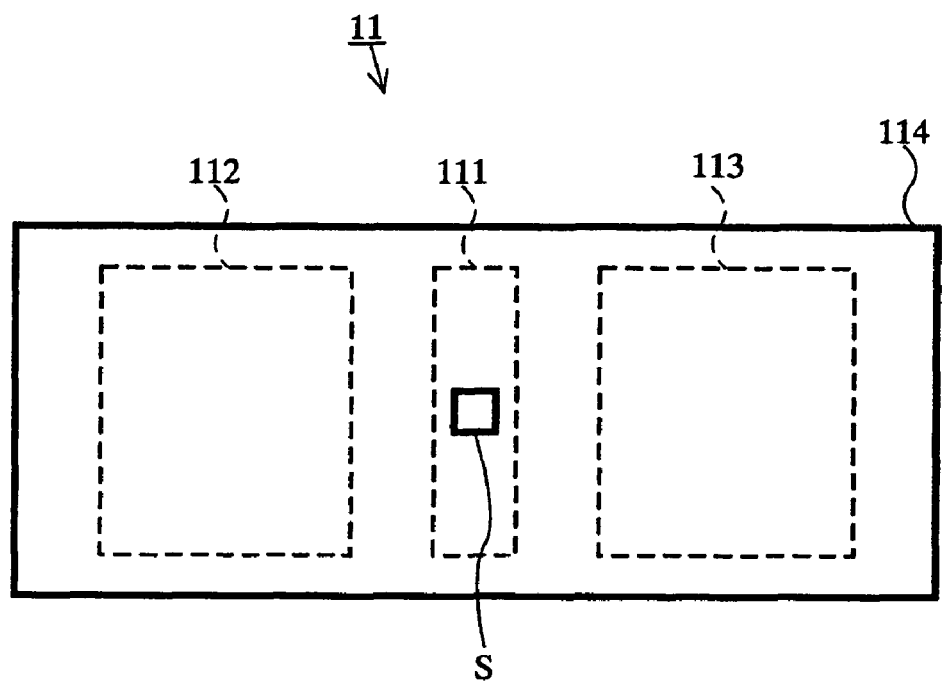
FIG. 3 is a front view schematically showing a structure of an operation input reception section 11 of FIG. 2 viewed from the side of seats in the car interior.
Figure 4:
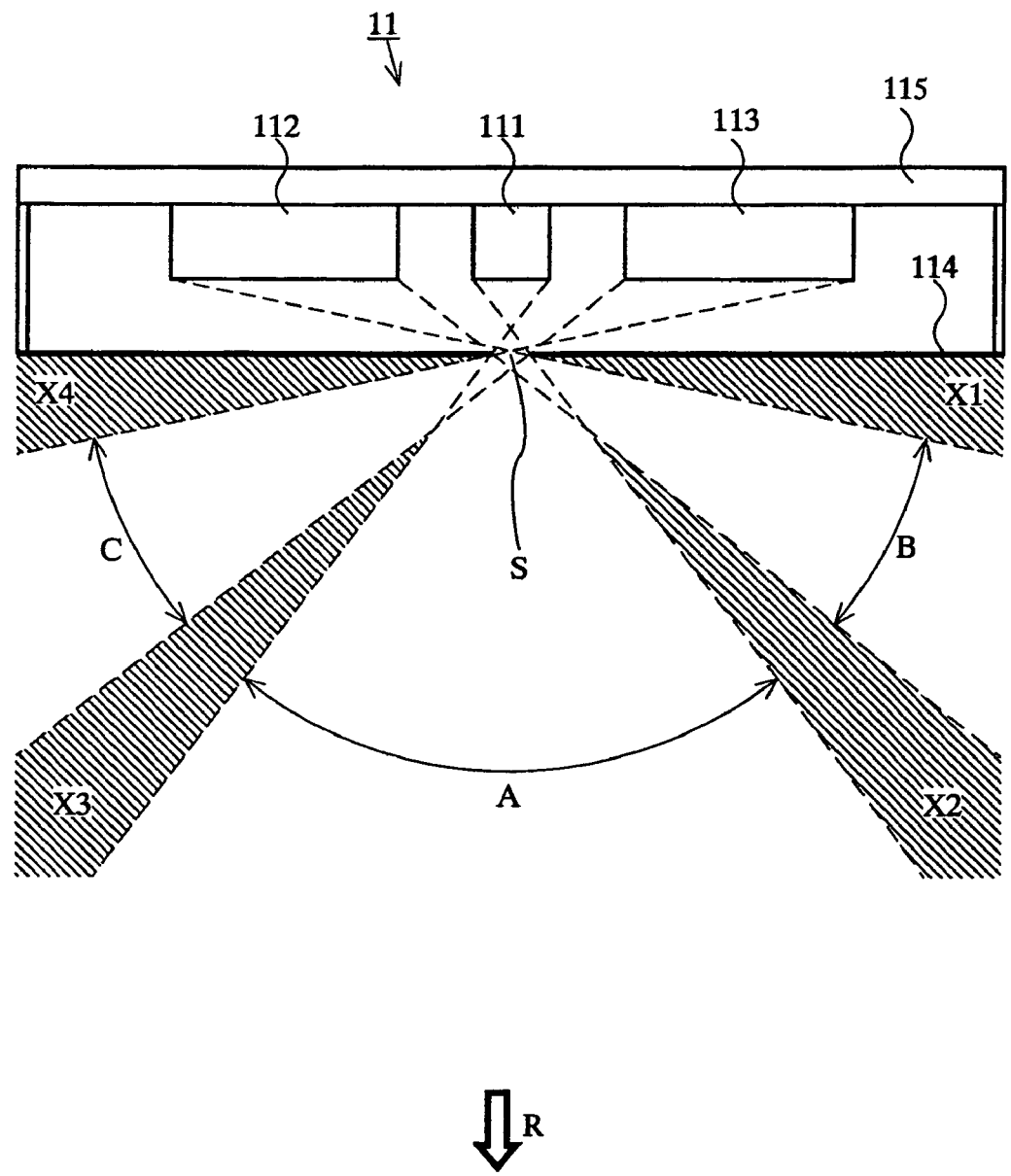
FIG. 4 is a top view schematically showing a structure of the operation input reception section 11 of FIG. 2 as viewed from thereabove in the car interior.
Figure 5:
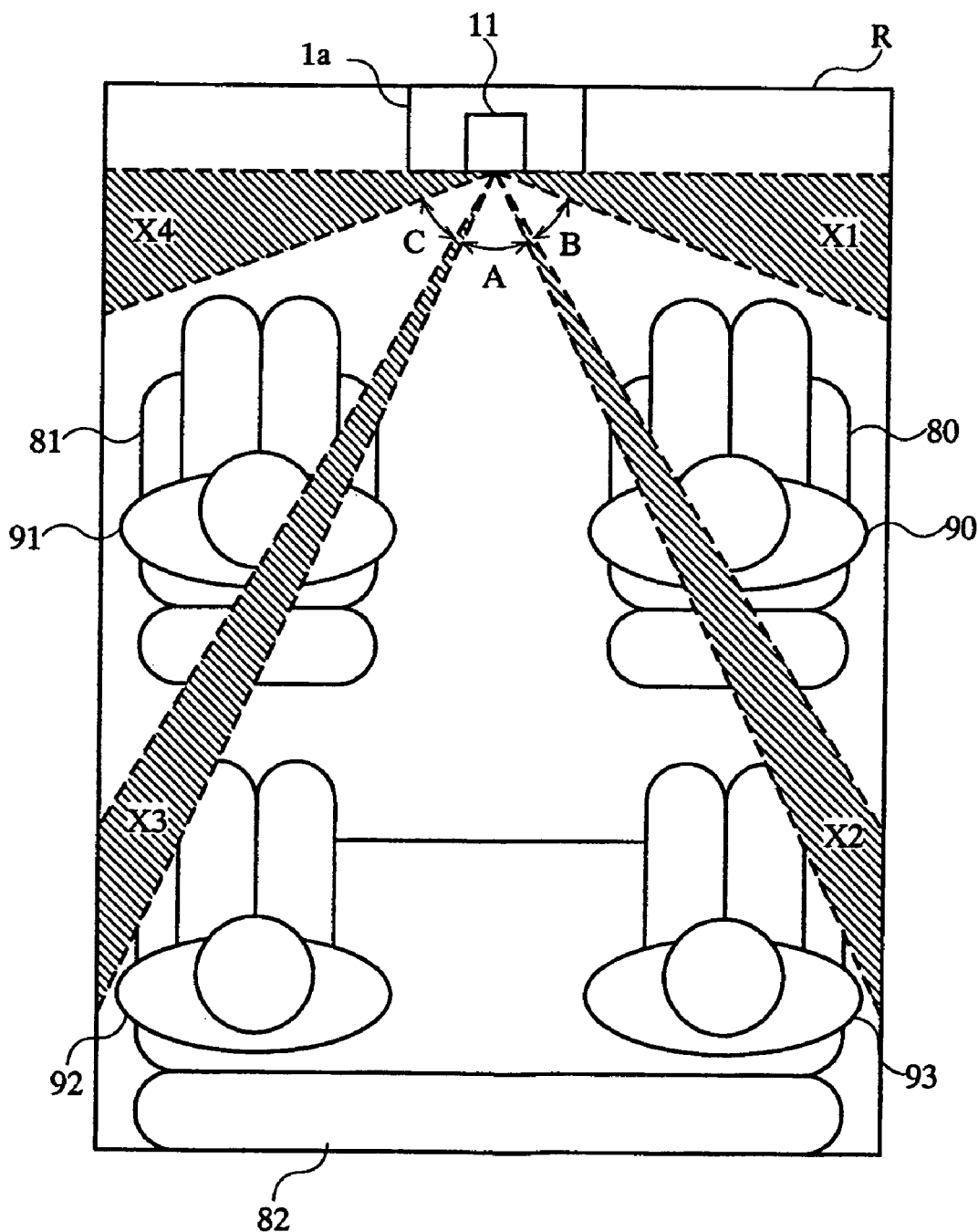
FIG. 5 is a schematic view exemplarily showing a car interior space R including spaces where first through third infrared light reception elements 111 through 113 of FIG. 2 are able to receive light.

Through a series of processing as described above, the in-car device provides guidance along the optimal route from the start point to a location set as the destination. During such guidance, the driver or other occupants of the car might wish to operate the in-car device for various purposes. In the car having the in-car device installed therein (see FIG. 1), the driver 90 and the passengers 91 through 93 are able to use one operation input transmission section 2 from their seats 80 through 82 to operate the in-car terminal 1a. Particularly, in an in-car device including a plurality of displays as described in the present embodiment, it is often the case that the occupants of the car wish to separately operate their viewing displays. For example, the occupants might wish to scroll the screen of the first or second display 3 or 4 in order to display a map of an area located ahead in the travel direction, or might wish to perform a scaling to display a map of a wider area. Moreover, the occupants might wish to change the destination during traveling and to search for a new destination. However, it is considerably difficult and hazardous for the driver driving the car to perform a complex input operation to set a new destination, for example. Therefore, the in-car device of the present invention limits acceptable operations which can be inputted by the driver while the car is traveling. Hereinbelow, the operation input reception section 11, which distinguishes the driver from the other occupants when receiving operation inputs, is described with reference to FIGS. 3 through 5. FIG. 3 is a front view schematically showing a structure of the operation input reception section 11 as viewed from the side of seats in the car interior (i.e., as viewed along a direction from bottom to top of the sheet of FIG. 1). FIG. 4 is a top view schematically showing a structure of the operation input reception section 11 as viewed from thereabove in the car interior. FIG. 5 is a schematic view exemplarily showing spaces where the first through third infrared light reception elements 111 through 113 are able to receive light.

In FIGS. 3 and 4, the operation input reception section 11 includes the first through third infrared light reception elements 111 through 113, a filter 114, and a supporting member 115. The first through third infrared light reception elements 111 through 113 are provided in parallel with the supporting member 115 so as to have their light reception planes directed to the car interior space R (i.e., directed to a direction indicated by an open arrow R shown in FIG. 4). The first through third infrared light reception elements 111 through 113 are fixed to the supporting member 115 and located at regular intervals, and the second and third infrared light reception elements 112 and 113 are respectively located left and right of the first infrared light reception element 111.

The filter 114 has a function of blocking infrared radiation, while having an infrared transmission region S (e.g., an opening) formed substantially in its center. The filter 114 is fixed to the supporting member 115 so as to be located on the side of the car interior space R at a predetermined distance from the light reception planes of the first through third infrared light reception elements 111 through 113. Specifically, when viewing the operation input reception section 11 from the car interior space R, the light reception planes of the first through third infrared light reception elements 111 through 113 are covered by the filter 114 located at the predetermined distance therefrom. The infrared transmission region S of the filter 114 is located in front of the light reception plane of the first infrared light reception element 111. It is preferred that the infrared transmission region S is provided in a size relatively smaller than those of the light reception planes of the first through third infrared light reception elements 111 through 113.

Infrared data D outputted from the operation input transmission section 2 propagates through the infrared transmission region S to one of the first through third infrared light reception elements 111 through 113. As described above, the infrared transmission region S is provided in the car interior space R so as to be located inside with respect to the first through third infrared light reception elements 111 through 113, and therefore the first through third infrared light reception elements 111 through 113 can receive only the infrared data D propagating from the operation input transmission section 2 through a corresponding one of their individually defined spaces. As shown in FIG. 4, the first through third infrared light reception elements 111 through 113 has their respective light receivable spaces A through C formed in the car interior space R. Specifically, only the first infrared light reception element 111 can receive the infrared data D outputted from the operation input transmission section 2 located in the light receivable space A, only the second infrared light reception element 112 can receive the infrared data D outputted from the operation input transmission section 2 located in the light receivable space B, and only the third infrared light reception element 113 can receive the infrared data D outputted from the operation input transmission section 2 located in the light receivable space C. Moreover, light unreceivable spaces X1 through X4 (indicated by hatched areas in FIG. 4) are formed in the car interior space R, such that neither one of the first through third infrared light reception elements 111 through 113 is able to receive the infrared data D outputted from the operation input transmission section 2 located in either one of light unreceivable spaces X1 through X4. Note that the light unreceivable space X2 is formed between the light receivable spaces A and B, and the light unreceivable space X3 is formed between the light receivable spaces A and C. The light unreceivable spaces X1 and X4 are formed in the front of the car interior space R so as to be located outside with respect to the light receivable spaces B and C, respectively. Accordingly, it is possible to prevent a plurality of light reception elements from receiving light coming from each of the spaces A through C.

The light receivable spaces A through C and the light unreceivable spaces X1 through X4 can be adjusted by changing the size and arrangement of elements of the operation input reception section 11. Specifically, light reception areas, directions, and positions of the first through third infrared light reception elements 111 through 113, an area and a size of the infrared transmission region S of the filter 114, a distance from the infrared transmission region S to each of the first through third infrared light reception elements 111 through 113, the position of the infrared transmission region S in relation to the first through third infrared light reception elements 111 through 113, etc., are suitably changed so as to obtain light receivable spaces A through C and the light unreceivable spaces X1 through X4 in a desired manner.

FIG. 5 shows an exemplary car interior space R in which the light receivable spaces A through C and the light unreceivable spaces X1 through X4 are formed. As shown in FIG. 5, the light receivable space A is formed so as to mainly include the rear passenger seat 82. The light receivable space B is formed so as to mainly include the driver's seat 80. The light receivable space C is formed so as to mainly include the front passenger seat 81. Accordingly, in the case where the driver 90 sitting in the driver's seat 80 operates the operation input transmission section 2, the infrared data D describing the driver's operation is outputted from the light receivable space B, and received only by the second infrared light reception element 112. Alternatively, in the case where the passenger 91 sitting in the front passenger seat 81 operates the operation input transmission section 2, the infrared data D describing the passenger's operation is outputted from the light receivable space C, and received only by the third infrared light reception element 113. Alternatively still, in the case where the passenger 92 or 93 sitting in the rear passenger seat 82 operates the operation input transmission section 2, the infrared data D describing the passenger's operation is outputted from the light receivable space A, and received only by the first infrared light reception element 111. That is, the in-car device according to the first embodiment recognizes which one of the first through third infrared light reception elements 111 through 113 has received the infrared data D, thereby determining the seat from which the infrared data D is outputted.

Figure 6:
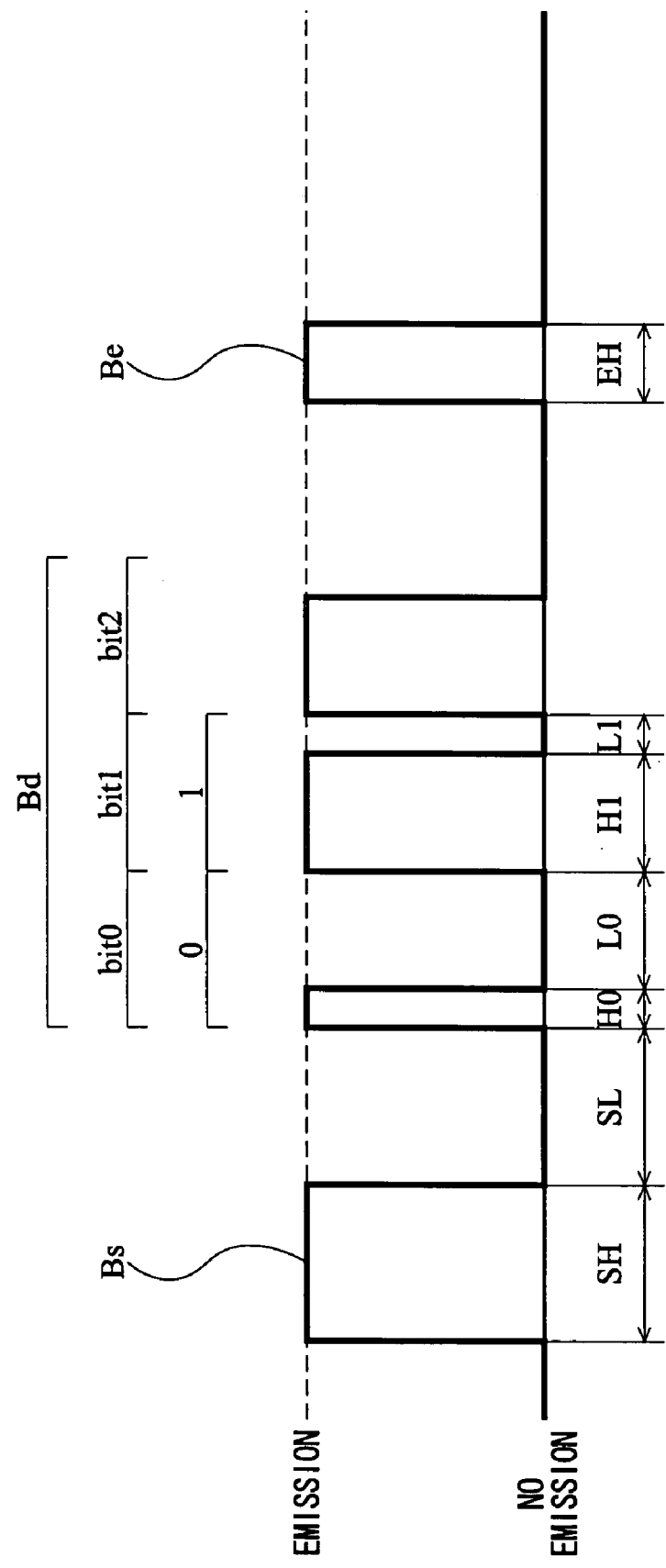
FIG. 6 shows an exemplary data format of infrared data D outputted from an operation input transmission section 2 of FIG. 2.

Next, a data format of the infrared data D outputted from the operation input transmission section 2 is described with reference to FIG. 6. FIG. 6 shows an exemplary data format of the infrared data D.

In FIG. 6, the infrared data D outputted from the operation input transmission section 2 contains bit data generated by the operation input transmission section 2 repeatedly emitting and ceasing to emit infrared radiation during a predetermined time period. When the operation input transmissions section 2 emits infrared light, an infrared light emission part of the operation input transmissions section 2 blinks on and off at a 38 kHz carrier frequency, for example. The infrared data D contains a start bit Bs, a data field Bd, and a stop bit Be. The start bit Bs indicates a beginning of the infrared data D, and is distinguished from other bits by a combination of an emission duration SH and an extinction duration SL. The stop bit Be indicates the end of the infrared data D, and is distinguished from other bits by an emission duration EH. The data field Bd is outputted between the start bit Bs and the stop bit Be. The data field Bd is outputted after a lapse of the extinction duration SL of the start bit Bs, and represents databits "0" and "1" using different sets of emission and extinction durations. For example, a set of an emission duration H0 and an extinction duration L0 represents data bit "0", and a set of an emission duration H1 and an extinction duration L1 represents data bit "1". In the example of FIG. 6, the data field Bd contains three data bits respectively denoted by bit0, bit1, and bit2.

Described next is an operation of the operation input permission determination section 12$a$. The operation input permission determination section 12$a$ receives data D1 through D3, which describes operation instructions, from the first through third infrared light reception elements 111 through 113, respectively. The operation input permission determination section 12$a$ recognizes that the data D1 indicates an operation instruction from a passenger sitting in the rear passenger seat 82, the data D2 indicates an operation instruction from the driver sitting in the driver's seat 80, and the data D3 indicates an operation instruction from a passenger sitting in the front passenger seat 81, thereby determining operation positions where the data D1 through D3 are outputted. The operation input permission determination section 12$a$ refers to the operating function allocation table stored in the operation input table storage section 15 in accordance with data bits of the data field Bd represented by the data D1 through D3.

FIG. 7 is a diagram used for explaining an exemplary operating function allocation table stored in the operation input table storage section 15. In the operating function allocation table shown in FIG. 7, operating functions to be allocated are defined for each of the three data bits bit0 through bit2. The operating function allocation table shown in FIG. 7 shows five exemplary operating functions of the in-car terminal 1$a$, i.e., "map scroll", "map scale change", "current position call", "destination setting", and "information search". Although the actual operating function allocation table describes all operating functions which can be inputted to the in-car terminal 1$a$, operating functions other than the above five operating functions are not shown in FIG. 7. For example, the operating function allocation table shows that when all of the data bits bit0 through bit2 represent "0", the "map scroll" is allocated as an operating function inputted to the in-car terminal 1$a$. When the data bit bit0 indicates "1" and both the data bits bit1 and bit2 indicate "0", "map scale change" is allocated as an operating function inputted to the in-car terminal 1$a$.

The operation input permission determination section 12$a$ refers to the operating function allocation table as defined above to search for operating functions in accordance with the data bits of the data field Bd represented by the data D1 through D3 and to determine the operation instructions described by the data D1 through D3. Moreover, the operation input permission determination section 12$a$ determines whether the car is currently in a halt state or in a travel state based on various types of information outputted from the position detection section 17. Note that whether the car is in a halt state or in a travel state is determined with reference to a car speed obtained by the position detection section 17. Specifically, if the car speed is zero, the car is determined as currently halting, and if otherwise, the car is determined as currently traveling. The operation input permission determination section 12$a$ refers to the operation input permission table stored in the operation input table storage section 15 in accordance with the operation positions, the descriptions of operation instructions, and the current states of the car.

FIG. 8 is a diagram used for explaining an exemplary operation input permission table stored in the operation input table storage section 15. In the operation input permission table shown in FIG. 8, instructions to be permitted are defined in accordance with the operation positions, the current states of the car, and the descriptions of the operation instructions. The operation input permission table shown in FIG. 8 shows five exemplary operation instructions of the in-car terminal 1$a$, i.e., "map scroll", "map scale change", "current position call", "destination setting", and "information search". Although the actual operation input permission table describes all operating functions which can be inputted to the in-car terminal 1$a$, operating functions other than the above five operating functions are not shown in FIG. 8. In the operation input permission table, for each combination of the operation position and the travel state of the car, a function instruction to be permitted is indicated by "○" and a function instruction not to be permitted is indicated by "x".

For example, the operation input permission table shows that if the operation input transmission section 2 is operated in the driver's seat, all function instructions are permitted when the car is in a halt state. However, when the car is traveling, only the map scroll, map scale change, and current position call function instructions are permitted, and the destination setting and information search function instructions are not permitted. This indicates that for safety reasons, the driver is not allowed to perform a complex operation while driving the car.

On the other hand, the operation input permission table shows that if the operation input transmission section 2 is operated in the front passenger seat, all function instructions are permitted regardless of whether the car is in a halt state or in a travel state. This indicates that in general, the safety of a traveling car is not influenced by the passenger in the front passenger seat inputting an operation instruction to the in-car terminal 1a, and therefore all function instructions are permitted in consideration of convenience use of the in-car device.

The operation input permission table also shows that if the operation input transmission section 2 is operated in the rear passenger seat, only the current position call function is allowed and the map scroll, map scale change, destination setting, and information search function instructions are not permitted regardless of whether the car is in a halt state or in a travel state. This is intended to prevent an operating error because descriptions displayed on the first and second displays 3 and 4 might not be fully viewed from the position of the rear passenger seat.

Note that settings of the operation input permission table in relation to whether the above function instructions are permitted are not limited to those as described above. The operation input permission table can be set in a desired manner in consideration of the safety of a traveling car, the convenient use of the in-car device, prevention of an operating error, etc. For example, in the case where it is not expected to prevent a passenger in the rear passenger seat from committing an operating error, settings for the rear passenger seat may be determined in a manner similar to settings for the front passenger seat. Alternatively, in order to completely avoid any operating error which can be committed by the passenger in the rear passenger seat, the settings for the rear passenger seat may be determined such that operations for all function instructions are not permitted.

As described above, the operation input permission determination section 12a refers to the operation input permission table defined in a manner as described above, thereby determining whether the operation instructions are permitted, based on a seat where the operation input transmission section 2 is operated and a travel state of the car. If the operation input permission determination section 12a determines that an operation instruction should be permitted, the operation instruction is outputted to the calculation processing section 13a which performs a process in accordance with the operation instruction outputted from the operation input permission determination section 12. On the other hand, if the operation input permission determination section 12a does not determine that an operation instruction should be permitted, for example, the data D1 through D3 outputted from the operation input reception section 11 are deleted such that the operation instruction is not outputted to the calculation processing section 13a.

As described above, in the in-car device according to the first embodiment, for an operation input provided by one operation input transmission section, it is determined whether the operation input transmission section is operated in the driver's seat, in the front passenger seat, or in the rear passenger seat. Then, whether to permit the operation input is determined based on the position of the seat where the operation input transmission section is operated and the travel status of the car at the time the operation input transmission section is operated. This allows the in-car device to avoid any risk which can be caused by the driver performing a complex operation while driving the car. Further, it is made possible for any operation input to be performed in the front passenger seat regardless of whether the car is in a travel state or in a halt state, thereby achieving convenient use of the in-car device. Furthermore, it is made possible to completely avoid any operating error which can be committed by the passenger in the rear passenger seat since displays are located afar from the rear passenger seat and there is a difficulty for a passenger in the rear passenger seat to view the displays.

An effect similar to that described above can be achieved by using a plurality of operation input transmission sections (i.e., remote controls) separately provided for use in the driver's seat, the front passenger seat, and the rear passenger seat. In this case, a different ID is allocated to a signal transmitted from each remote control in order to make it possible for the receiving side to identify the ID of a received signal and thereby to recognize which remote control has transmitted the signal, i.e., in which seat an operation input is performed. However, a cost increase is incurred by providing the plurality of remote controls, and it is uncomfortable to have more than one remote control in the interior of the car. In the in-car device according to the first embodiment, only one remote control is used to achieve an effect as described above without causing the above problems.

Note that although the first embodiment has been described with respect to a case where the in-car device includes two displays, the in-car device may include only one display or three or more displays.

(Second Embodiment)

Figure 9:
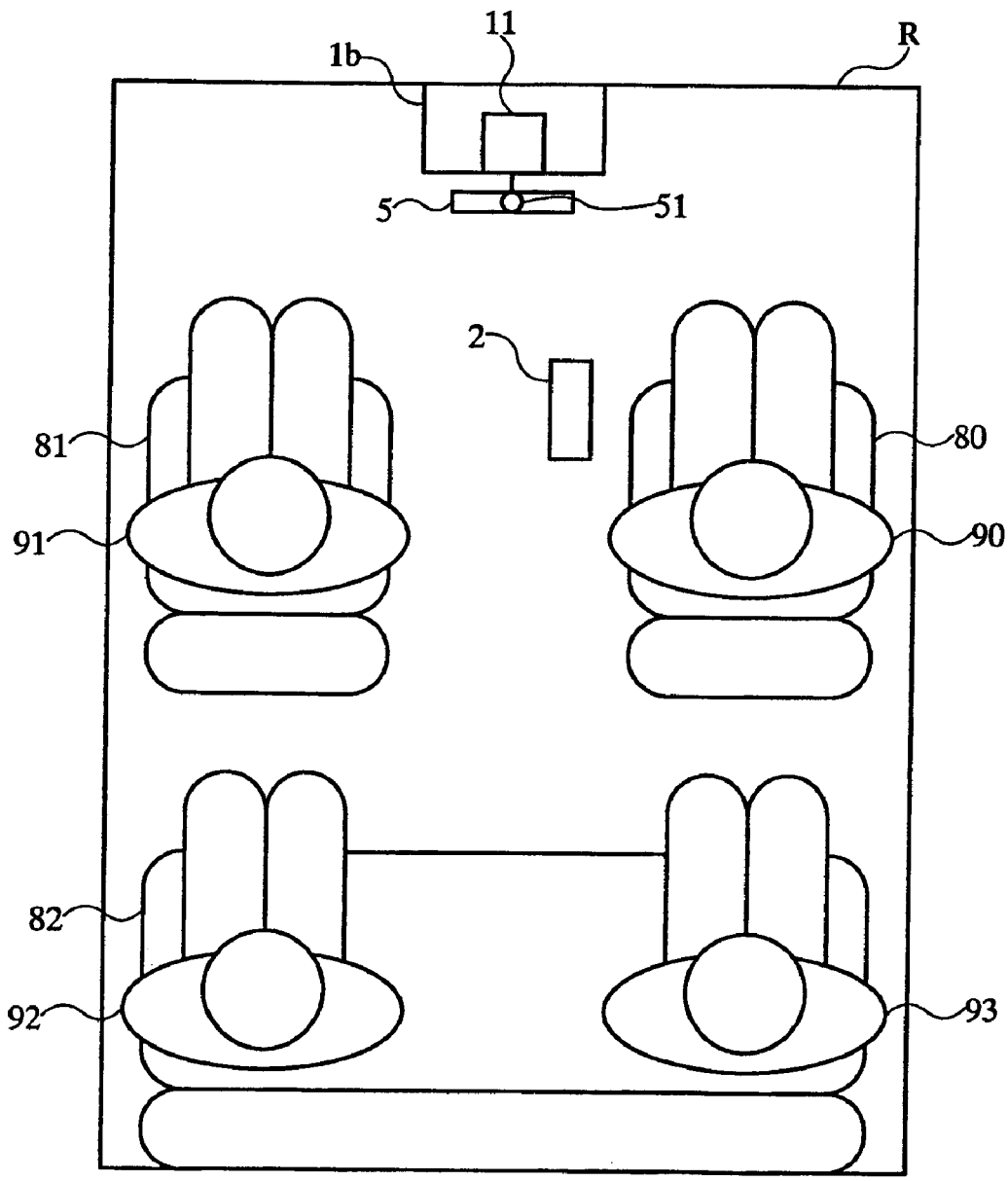
FIG. 9 is a top view schematically showing an exemplary car interior space in which an in-car device according to a second embodiment of the present invention is installed.

An in-car device according to a second embodiment of the present invention is described with reference to FIG. 9. As described below, the in-car device according to the second embodiment is, for example, a display device including one display which can be turned so as to have its display plane directed to each occupant of a car having the in-car device installed therein. FIG. 9 is a top view schematically showing an exemplary car interior space in which the in-car device is installed. The in-car device according to the second embodiment is similar to that described in the first embodiment except that the first and second displays 3 and 4 are replaced by a third display 5 which is controlled by elements different from elements used for controlling the first and second displays 3 and 4. In FIG. 9, the same reference numerals are used to denote elements of the in-car device according to the second embodiment which are similar to those of the in-car device according to the first embodiment, and the detailed descriptions of such similar elements are omitted here.

In FIG. 9, as in the first embodiment, an exemplary car having installed therein the in-car device according to the second embodiment has the car interior space R in which the driver's seat 80, the front passenger seat 81, and the rear passenger seat 82 are provided. In the car interior space R shown in FIG. 9, the driver 90 is in the driver's seat 80, the passenger 91 is in the front passenger seat, and the passengers 92 and 93 are in the rear passenger seat 82. The in-car device includes an in-car terminal 1b, the operation input transmission section 2, and the third display 5. The in-car terminal 1b is fixed in the car interior space R so as to be located ahead substantially from the middle between the driver's seat 80 and the front passenger seat 81. Similar to the in-car terminal 1a described in the first embodiment, the in-car terminal 1b implements processing in accordance with infrared data outputted from the operation input transmission section 2, and outputs a processing result to the third display 5. The third display 5 is supported by a display turn section 51 which allows the display plane of the third display 5 to be directed to each of the seats 80 through 82. The third display 5 essentially includes a crystal liquid device and a drive device thereof. The third display 5 may further include a sound output device, e.g., a loudspeaker, such that the third display 5 can display an image and/or generate sound as a processing result of the in-car terminal 1b. For simplification of description, in the following example, the in-car terminal 1b displays an image as the processing result on the third display 5.

Figure 10:
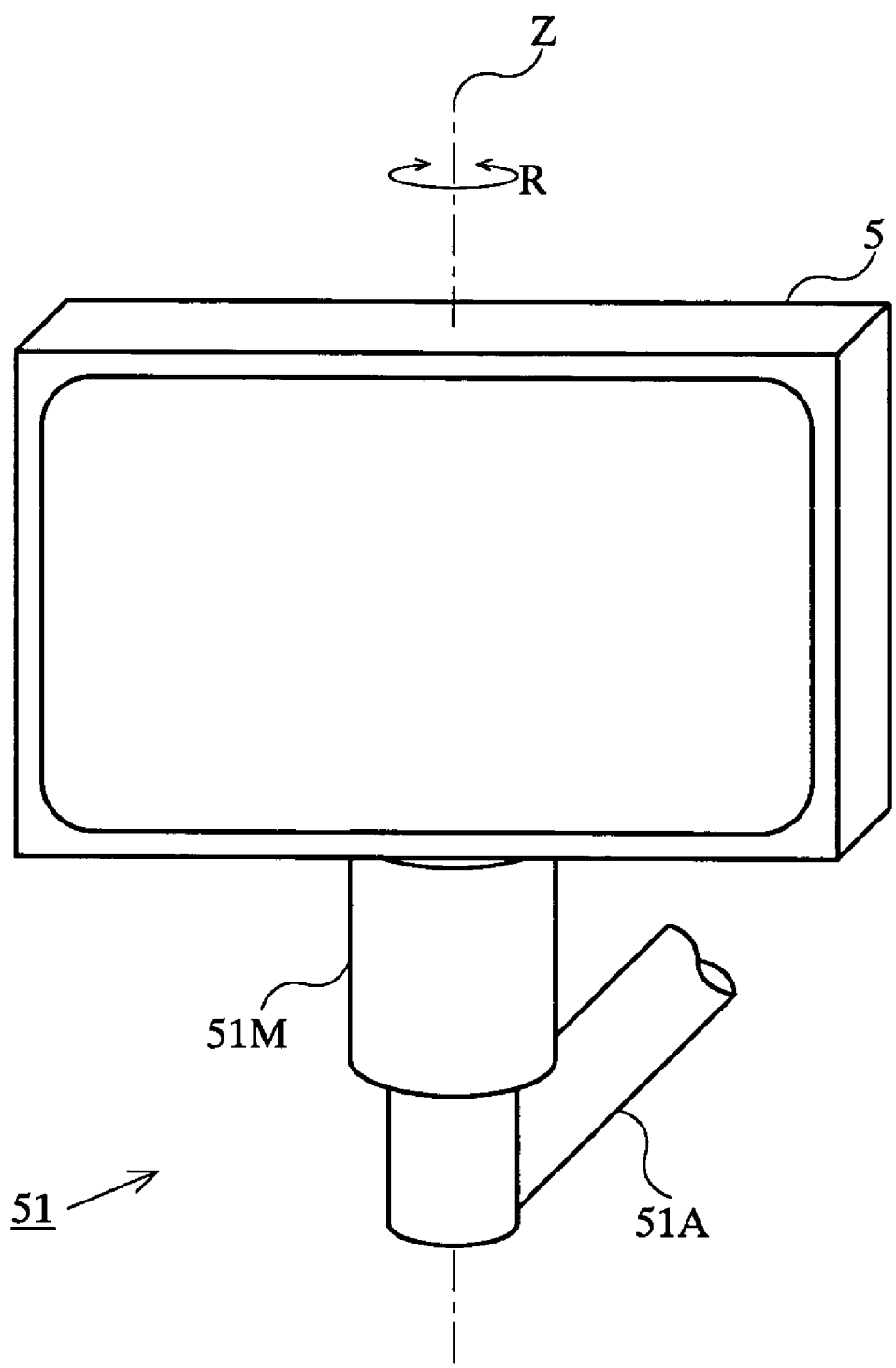
FIG. 10 is an external perspective view used for explaining structures of a third display 5 and a display turn section 51 of FIG. 9.

Next, the third display 5 and the display turn section 51 are described with respect to their structures with reference to FIG. 10. FIG. 10 is an external perspective view used for explaining the structures of the third display 5 and the display turn section 51.

The display turn section 51 includes an installation arm 51A and a stepping motor 51M. The stepping motor 51M is fixed on one end portion of the installation arm 51A. The other end of the installation arm 51A is fixed to the in-car terminal 1b or the car. The stepping motor 51M is configured so as to turn by an arbitrary angle about its rotation axis Z in accordance with an instruction given by the in-car terminal 1b. The third display 5 is supported on the top of the stepping motor 51M so as to turn about the rotation axis Z of the stepping motor 51M in a direction indicated by R in FIG. 10. The in-car terminal 1b instructs the stepping motor 51M to turn by a prescribed angle so as to direct the display plane of the third display 5 to either one of the seats 80 through 82.

Figure 11:
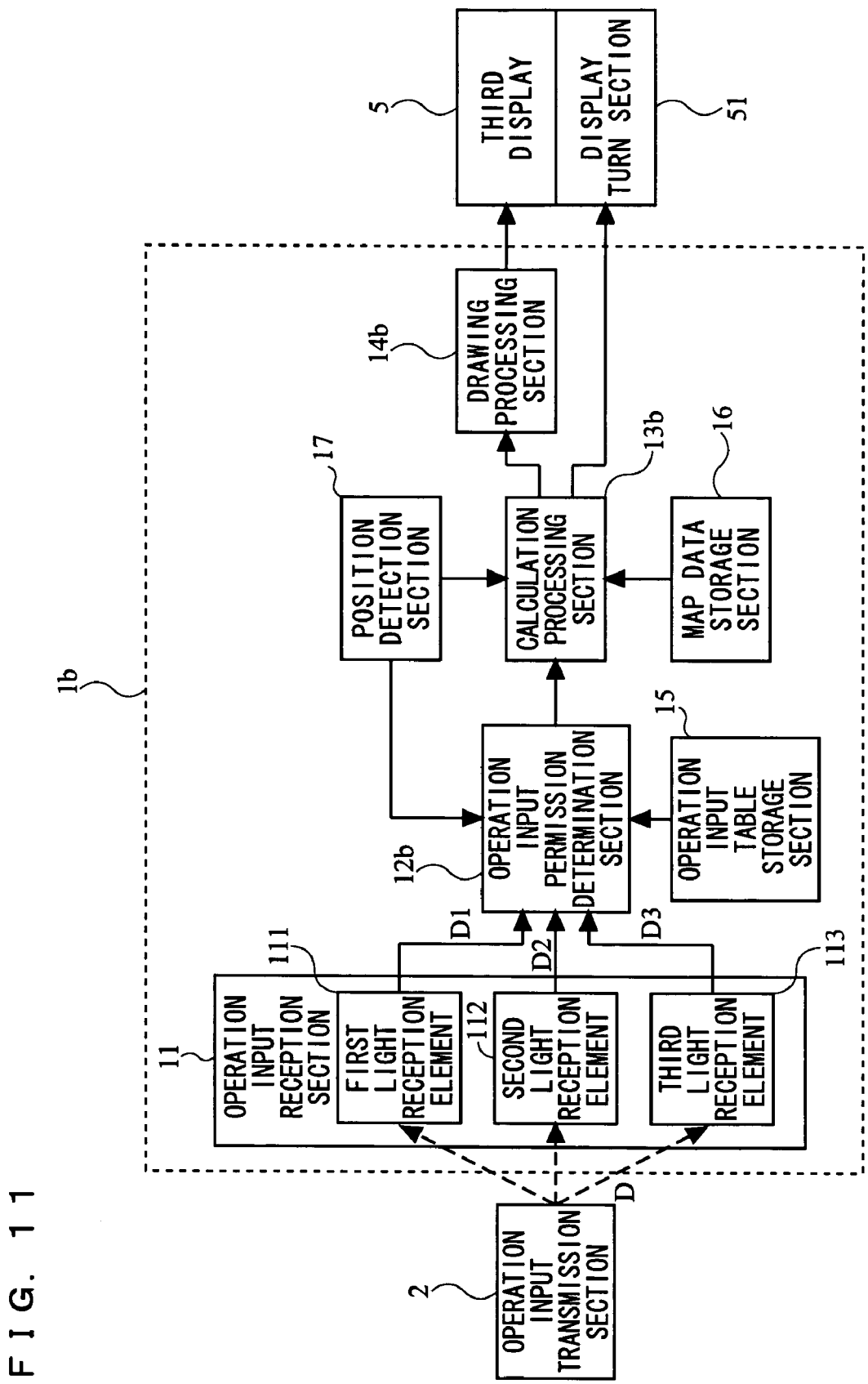
FIG. 11 is a functional block diagram showing a structure of the in-car device of FIG. 9.

Next, the structure of the in-car device according to the second embodiment is described with reference to FIG. 11. FIG. 11 is a block diagram showing the structure of the in-car device according to the second embodiment.

As described above, the in-car device includes the in-car terminal 1b, the operation input transmission section 2, the third display 5, and the display turn section 51. The in-car terminal 1b includes the operation input reception section 11, an operation input permission determination section 12b, a calculation processing section 13b, a drawing processing section 14b, the operation input table storage section 15, the map data storage section 16, and the position detection section 17. As described above, the in-car device according to the second embodiment differs from that described in the first embodiment in that the third display 5 is controlled by the operation input permission determination section 12b, the calculation processing section 13b, and the drawing processing section 14b, which are different from elements used for controlling the first and second displays 3 and 4.

As in the first embodiment, the operation input permission determination section 12b recognizes that data D1 through D3 received from the operation input reception section 11 are respectively derived from the first through third infrared light reception elements 111 through 113. The operation input permission determination section 12b analyzes descriptions of operation inputs represented by the data D1 through D3, and determines whether to accept the operation inputs from the output sources, i.e., the first through third infrared light reception elements 111 through 113. Specifically, the operation input permission determination section 12b obtains a current travel state of the car from the position detection section 17, and refers to the operating function allocation table and the operation input permission table, which are stored in the operation input table storage section 15, to determine whether combinations of the output sources and the descriptions of the operation inputs are acceptable. Determination operations of the operation input permission determination section 12b are similar to those of the input permission determination section 12a described in the first embodiment, and therefore the detailed descriptions thereof are omitted here. If there is an acceptable combination of an output source and a description of an operation input, the operation input permission determination section 12b assigns an identifier to the description of the operation input such that the output source (i.e., the first, second, or third infrared light reception element 111, 112, or 113) of data (D1, D2, or D3) indicating the description of the operation input is distinguished from other output sources. Then, the operation input permission determination section 12b outputs the description of the operation input having the identifier assigned thereto to the calculation processing section 13b. On the other hand, if there is no acceptable combination, the operation input permission determination section 12b deletes the data D1 through D3 received from the operation input reception section 11, for example, without outputting the descriptions of the operation inputs to the calculation processing section 13b.

As in the first embodiment, the calculation processing section 13b performs various types of data processing based on the description of the operation input having the identifier assigned thereto and received from the operation input permission determination section 12b, a processing result received from the position detection section 17, and map data stored in the map data storage section 16. Examples of the data processing performed by the calculation processing section 13b include a process of displaying a map of an area around an arbitrary location, a process of searching for a route between arbitrary locations, and a process of providing guidance along an obtained route. The above processes are as described in the first embodiment, and the detailed descriptions thereof are omitted here. The calculation processing section 13b includes a stepping motor control IC, and provides the display turn section 51 with an instruction to turn in accordance with the identifier assigned to the description of the operation input. The details of this display turn control operation is described below.

The drawing processing section 14b performs a process of outputting processing results, which are obtained from various processes performed by the calculation processing section 13b, to the third display 5. As in the first embodiment, the operation input permission determination section 12b, the calculation processing section 13b, the drawing processing section 14b, and the operation input table storage section 15 are realized by a computer system including a central processing unit (CPU), various processors, a memory, a hard disk, etc.

Figure 12:
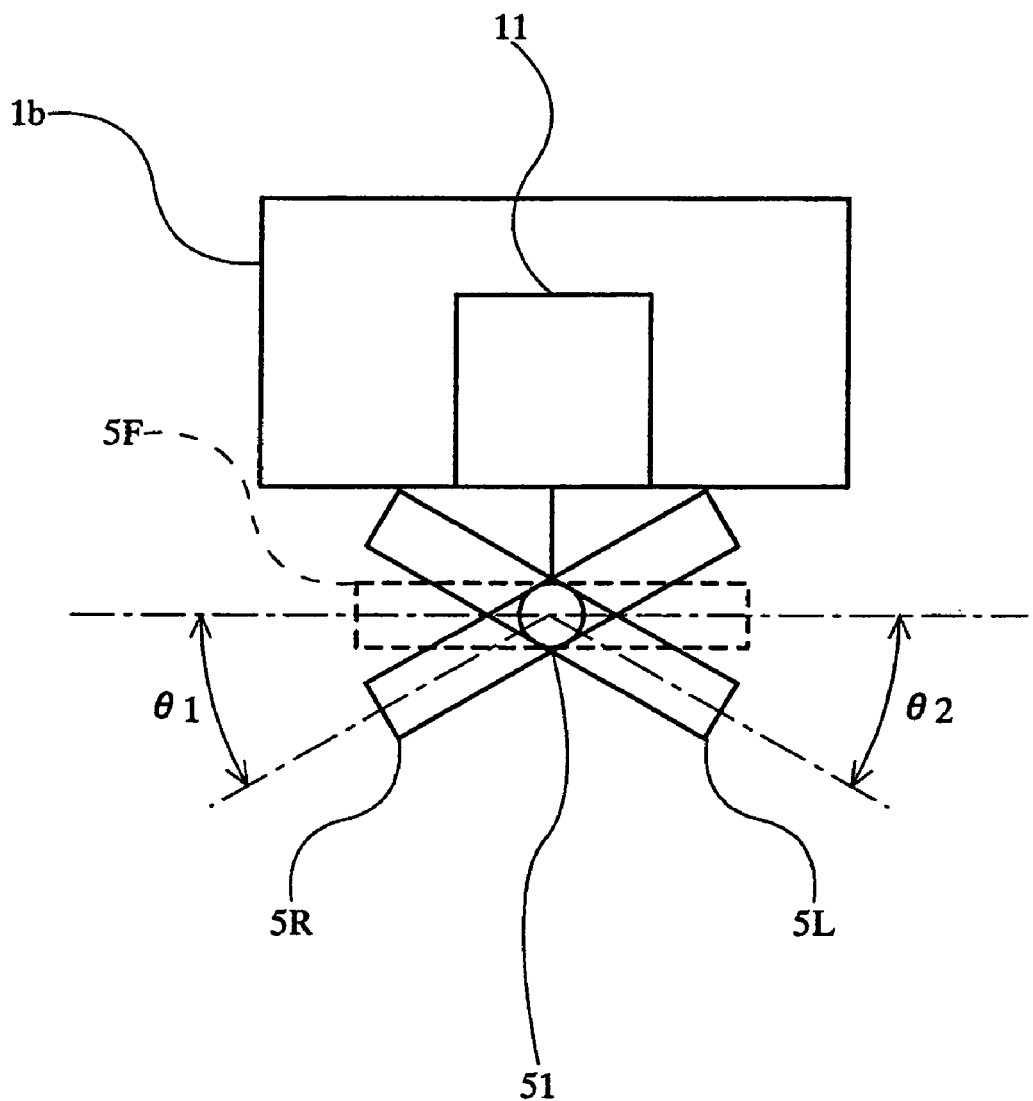
FIG. 12 is a schematic top view used for explaining rotation angles of the third display 5 of FIG. 9.
Figure 13:
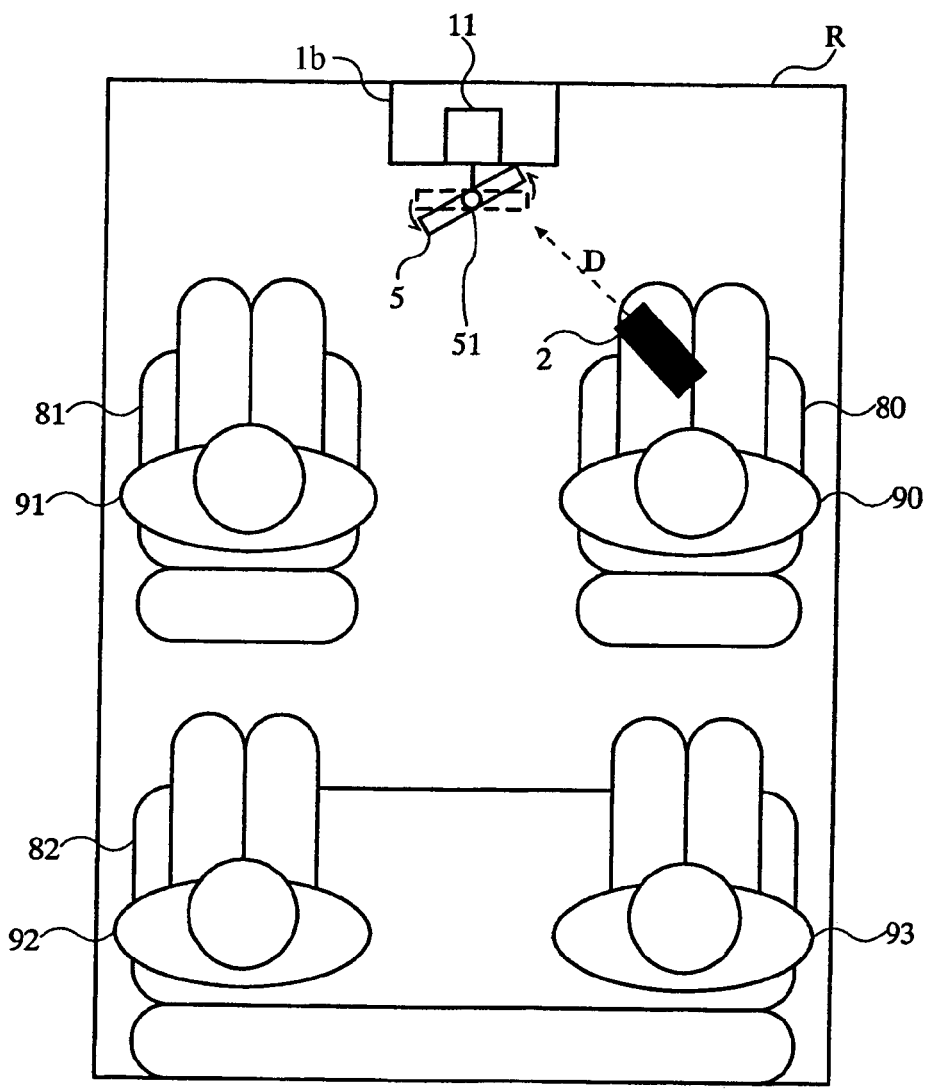
FIG. 13 is a schematic top view of the car interior space R having the in-car device of FIG. 9 provided therein which shows an exemplary turn movement of the third display 5.

Next, referring to FIGS. 12 and 13, the in-car device according to the second embodiment is described with respect to an exemplary turn movement of the display, which differentiates the second embodiment from the first embodiment. FIG. 12 is a schematic top view used for explaining rotation angles of the third display 5. FIG. 13 is a schematic top view of the car interior space R having the in-car device provided therein which shows an exemplary turn movement of the third display 5.

As described above, the third display 5 is supported on the top of the stepping motor 51M so as to turn about the rotation axis of the stepping motor 51M in accordance with an instruction given by the in-car terminal 1b. The operation input permission determination section 12b recognizes which one of the first through third infrared light reception elements 111 through 113 has received infrared data D from the operation input transmission section 2, thereby determining in which one of the light receivable spaces A through C (see FIG. 5) the operation input transmission section 2 has been operated. The operation input permission determination section 12b assigns an identifier to the description of an instruction indicated by the infrared data D, and outputs the description of the instruction having the identifier assigned thereto to the calculation processing section 13b.

Based on the identifier, the calculation processing section 13b instructs the stepping motor 51M to turn by a prescribed angle so as to direct the display plane of the third display 5 to either one of the seats 80 through 82. For example, if the operation input is provided by the operation input transmission section 2 in the driver's seat 80, the calculation processing section 13*b* causes the third display 5 to turn to the driver's seat 80, if the operation input is provided by the operation input transmission section 2 in the front passenger seat 81, the calculation processing section 13*b* causes the third display 5 to turn to the front passenger seat 81, and if the operation input is provided by the operation input transmission section 2 in the rear passenger seat 82, the calculation processing section 13*b* causes the third display 5 to turn to the rear passenger seat 82 (i.e., to the front).

In FIG. 12, the stepping motor control IC included in the calculation processing section 13*b* drives the stepping motor 51M included in the display turn section 51, thereby turning the third display 5 by one of three predetermined angles. In FIG. 12, a third display 5F is shown so as to have its display plane directed to the front (dotted lines), a third display 5R is shown so as to have its display plane turned by an angle of θ1 from the front to the driver's seat 80 (solid lines), and a third display 5L is shown so as to have its display plane turned by an angle of θ2 from the front to the front passenger seat 81 (solid lines). The calculation processing section 13*b* controls the stepping motor 51M so as to turn to a direction determined by either one of the three angles as described above. In order to control the third display 5 so as to be directed to the driver's seat 80, θ1 is preferably set so as to be, but not limited to, about 30°, and in order to control the third display 5 so as to be directed to the front passenger seat 81, θ2 is preferably set so as to be, but not limited to, about 30°.

If the identifier outputted from the operation input permission determination section 12*b* indicates light reception by the first infrared light reception element 111, the calculation processing section 13*b* controls the stepping motor 51M so as to turn by an angle such that the display plane of the third display 5 (i.e., the third display 5F) is directed to the front. If the identifier outputted from the operation input permission determination section 12*b* indicates light reception by the second infrared light reception element 112, the calculation processing section 13*b* controls the stepping motor 51M so as to turn toward the driver's seat 80 such that the display plane of the third display 5 (i.e., the third display 5R) makes an angle of θ1 with respect to the front. If the identifier outputted from the operation input permission determination section 12*b* indicates light reception by the third infrared light reception element 113, the calculation processing section 13*b* controls the stepping motor 51M so as to turn toward the front passenger seat 81 such that the display plane of the third display 5 (i.e., the third display 5R) makes an angle of θ2 with respect to the front.

FIG. 13 is a view used for explaining how the third display 5 turns when the infrared data D is transmitted from the operation input transmission section 2 by the driver 90 in the driver's seat 80 operating the operation input transmission section 2. If the driver 90 sitting in the driver's seat 80 operates the operation input transmission section 2, the infrared data D is outputted from the light receivable space B (see FIG. 5) of the car interior space R. In this case, the infrared data D is received only by the second infrared light reception element 112 (see FIG. 4), and the received infrared data D is outputted as data D2 to the operation input permission determination section 12*b*. If an operation instruction indicated by the data D2 is permitted, the operation input permission determination section 12*b* assigns an identifier to the operation instruction indicated by the data D2 in order to indicate light reception by the second infrared light reception element 112, and the operation instruction having the identifier assigned thereto is outputted to the calculation processing section 13*b*. The calculation processing section 13*b* controls the stepping motor 51M based on the identifier so as to turn toward the driver's seat 80 such that the display plane of the third display 5 (i.e., the third display 5R of FIG. 12) makes an angle of θ1 with respect to the front. Thus, the third display 5 turns so as to have its display plane directed to the driver's seat 80.

As described above, in the in-car device according to the second embodiment, the display is turned so as to be directed to the user, thereby achieving an effect of facilitating easy viewing of the display from each occupant of the car as well as easy operation of the in-car device, while achieving an effect similar to that achieved by the in-car device according to the first embodiment. A plurality of light reception elements included in the operation input reception section 11 have a characteristic of being able to receive infrared data from the operation input transmission section when the infrared data is transmitted through their respective light receivable spaces. The in-car device according to the second embodiment is exemplarily provided by taking advantage of the above characteristic so as to turn the display plane to the user.

The in-car devices according to the first and second embodiments have been described with respect to a case where a map display process, a position detection process, a route search process, a route guidance process, etc., are performed using digital map data, and process results are shown on the display. However, the in-car device of the present invention is not limited to navigation processing as described above. For example, the in-car device of the present invention can be implemented as an in-car video display device for processing video data from a TV broadcast, DVD video data, or the like, and displaying the processed data as video information.

Recent years have seen the development of a display technique as shown in FIG. 14 which combines a liquid crystal display 6 and a lenticular lens 7 such that different video images can be seen on the liquid crystal display 6 from different viewing angles. By using this display technique, it is made possible to simultaneously display programs on different channels or simultaneously display a terrestrial television program and DVD video. Accordingly, different video images can be seen on the liquid crystal display 6 via the lenticular lens 7 from different viewing angles. The present invention can be applied to an in-car device including a single display employing the above display technique. In the present invention, it is possible to determine in which direction one operation input transmission section 2 is operated to provide an instruction to the display. Therefore, by controlling the display shared between occupants of the car in accordance with different operation directions such that different video images can be seen on the display from the different operation directions, it is made possible for the occupants to view different video images.

While the invention has been described in detail, the foregoing description is in all aspects illustrative and not restrictive. It is understood that numerous other modifications and variations can be devised without departing from the scope of the invention.

What is claimed is:

1. An in-car device for implementing processing in accordance with an operation instruction from an occupant of a car, the device comprising:

an operation input transmission section for emitting a beam in accordance with the occupant's operation, the beam carrying data which indicates an operation instruction given by the occupant's operation;

an operation input reception section for receiving the data emitted from the operation input transmission section located in one of a plurality of spatial segments defined in the car; and a processing section for implementing a process, which corresponds to the operation instruction indicated by the data received by the operation input reception section, in accordance with the operation instruction indicated by the data received by the operation input reception section and a spatial segment in which the data has been emitted.

2. The in-car device according to claim 1, wherein the operation input reception section includes a plurality of light reception elements each receiving the data emitted from the operation input transmission section located in a corresponding one of the plurality of spatial segments, and outputting the received data so as to be identified as having been emitted from the spatial segment.

3. The in-car device according to claim 2, wherein the operation input reception section further includes a filter provided on a side of the plurality of the spatial segments so as to form a gap having a predetermined size with a light reception portion of each of the plurality of light reception elements, the filter having a transmission region through which the beam emitted from the operation input transmission section is transmitted, and wherein the plurality of light reception elements each receive, through the transmission region of the filter, the data emitted from the operation input transmission section located in the corresponding one of the plurality of spatial segments.

4. The in-car device according to claim 3, wherein the plurality of light reception elements are provided at predetermined intervals in a horizontal direction.

5. The in-car device according to claim 1, wherein the plurality of spatial segments are defined in accordance with positions of seats provided in the car.

6. The in-car device according to claim 1, wherein the operation input transmission section emits the data by infrared radiation.

7. The in-car device according to claim 1, further comprising an operation input permission determination section for permitting the process, which corresponds to the operation instruction indicated by the data received by the operation input reception section, in accordance with the operation instruction indicated by the data received by the operation input reception section and the spatial segment in which the data has been emitted, wherein the processing section implements the process permitted by the operation input permission determination section.

8. The in-car device according to claim 7, further comprising a table storage section having stored therein an operation input permission table describing which process is permitted for combinations of operation instructions and the plurality of spatial segments, wherein the operation input permission determination section refers to the operation input permission table for a combination of the operation instruction indicated by the data received by the operation input reception section and the spatial segment in which the data has been emitted, thereby determining whether to permit the process, which corresponds to the operation instruction indicated by the data received by the operation input reception section.

9. The in-car device according to claim 8, further comprising a travel state detection section for detecting a current travel state of the car, wherein the operation input permission table describes which process is permitted for combinations of the operation instructions, the plurality of spatial segments, and travel states of the car, and wherein the operation input permission determination section refers to the operation input permission table for a combination of the operation instruction indicated by the data received by the operation input reception section, the spatial segment in which the data has been emitted, and the current travel state detected by the travel state detection section, thereby determining whether to permit the process, which corresponds to the operation instruction indicated by the data received by the operation input reception section.

10. The in-car device according to claim 9, wherein the operation input permission table describes which process is permitted for combinations of the plurality of spatial segments, which include a driver's seat, and the travel states, which include a travel state indicating that the car is currently traveling.

11. The in-car device according to claim 1, further comprising:

a plurality of displays for displaying video information on their respective display planes each being directed to a corresponding occupant's seat; and a drawing processing section for outputting the video information obtained from the process implemented by the processing section to each of the plurality of displays.

12. The in-car device according to claim 1, further comprising:

a display having a display plane on which video information is displayed;

a display turn section for turning the display to change a direction to which the display plane is directed; and a drawing processing section for outputting the video information obtained from the process implemented by the processing section to the display, wherein the processing section includes a direction instruction section for outputting an instruction to the display turn section so as to turn the display plane of the display to a direction of the spatial segment in which the data received by the operation input reception section has been emitted.

13. The in-car device according to claim 11, further comprising:

a map data storage section having predetermined map data stored therein; and a position detection section for detecting a current position of the car, wherein the processing section implements the process, which corresponds to the operation instruction indicated by the data received by the operation input reception section, based on the map data stored in the map data storage section and the current position detected by the position detection section, and wherein the drawing process section outputs to the display the video information obtained from the process implemented by the processing section based on the map data and the current position.

14. A processing method for implementing processing in accordance with an operation instruction from an occupant of a car, the method comprising the steps of:

emitting a beam in accordance with the occupant's operation, the beam carrying data which indicates an operation instruction given by the occupant's operation;

receiving the emitted data from a direction of one of a plurality of spatial segments defined in the car; and implementing a process, which corresponds to the operation instruction indicated by the received data, in accordance with the operation instruction indicated by the received data and a spatial segment in which the data has been emitted.

15. The processing method according to claim 14, wherein the emitted data is received from the direction of one of the plurality of spatial segments, and the received data is identified as having been emitted from the spatial segment.

16. The processing method according to claim 14, wherein the spatial segments are defined in accordance with positions of seats provided in the car.

17. The processing method according to claim 14, wherein the data is emitted by infrared radiation.

18. The processing method according to claim 14, further comprising the steps of:

permitting the process, which corresponds to the operation instruction indicated by the received data, in accordance with the operation instruction indicated by the received data and the spatial segment in which the data has been emitted; and implementing the permitted process.

19. The processing method according to claim 18, further comprising the step of referring to an operation input permission table for a combination of the operation instruction indicated by the received data and the spatial segment in which the data has been emitted, thereby determining whether to permit the process, which corresponds to the operation instruction indicated by the received data, wherein the operation input permission table describes which process is permitted for combinations of operation instructions and the plurality of spatial segments.

20. The processing method according to claim 19, wherein the operation input permission table describes which process is permitted for combinations of the operation instructions, the plurality of spatial segments, and travel states of the car, and wherein the method further includes the steps of:

detecting a current travel state of the car; and referring to the operation input permission table for a combination of the operation instruction indicated by the received data, the spatial segment in which the data has been emitted, and the detected current travel state, thereby determining whether to permit the process, which corresponds to the operation instruction indicated by the received data.

21. The processing method according to claim 20, wherein the operation input permission table describes which process is permitted for combinations of the plurality of spatial segments, which include a driver's seat, and the travel states, which include a travel state indicating that the car is currently traveling.

22. The processing method according to claim 14, further comprising the steps of:

generating video information based on a result of the process implemented in accordance with the operation instruction; and displaying the video information on different display planes corresponding to seats of occupants.

23. The processing method according to claim 14, further comprising the steps of:

generating video information based on a result of the process implemented in accordance with the operation instruction;

displaying the video information on a display plane; and turning the display plane to be directed to a direction of a spatial segment in which the received data has been emitted.

24. The processing method according to claim 22, further comprising the steps of:

detecting a current position of the car;

implementing the process, which corresponds to the operation instruction indicated by the received data, based on predetermined map data and the detected current position;

generating video information based on a result of the process, which has been implemented based on predetermined map data and the detected current position; and displaying the generated video information.

* * * * *